US012747039B2

(12) United States Patent
Jain et al.

(10) Patent No.: US 12,747,039 B2
(45) Date of Patent: Sep. 29, 2026

(54) SYSTEM AND METHOD OF EJECTING A PAYLOAD FROM AN EXTRATERRESTRIAL SURFACE

(71) Applicant: Honeybee Robotics, LLC, Longmont, CO (US)

(72) Inventors: Anchal Jain, Longmont, CO (US); Sean O'Brien, Kent, WA (US); Dara Sabahi, Longmont, CO (US); Philip Chu, Manvel, TX (US)

(73) Assignee: Honeybee Robotics, LLC, Longmont, CO (US)

( * ) Notice: Subject to any disclaimer, the term of this patent is extended or adjusted under 35 U.S.C. 154(b) by 45 days.

(21) Appl. No.: 19/032,897

(22) Filed: Jan. 21, 2025

(65) Prior Publication Data

US 2026/0208885 A1 Jul. 23, 2026

(51) Int. Cl.
*B64G 1/64* (2006.01)

(52) U.S. Cl.
CPC ............ *B64G 1/6457* (2023.08); *B64G 1/641* (2013.01)

(58) Field of Classification Search
CPC ......... B64G 1/6457; B64G 1/641; F41B 7/00; Y10T 292/0838
See application file for complete search history.

(56) References Cited

U.S. PATENT DOCUMENTS

| | | | | |
|---|---|---|---|---|
| 4,067,308 A * | 1/1978 | Andersen | F41B 7/00 | 446/236 |
| 4,181,062 A | 1/1980 | Bernstein et al. | | |
| 4,506,852 A | 3/1985 | Adams et al. | | |
| 4,711,417 A | 12/1987 | Steffy | | |
| 5,226,617 A * | 7/1993 | Panin | B64G 1/641 | 292/35 |
| 6,227,493 B1 * | 5/2001 | Holemans | B64G 1/642 | 285/82 |
| 9,732,776 B2 | 8/2017 | Madsen et al. | | |
| 10,329,036 B2 | 6/2019 | Cassanelli et al. | | |
| 2015/0097085 A1 * | 4/2015 | Holemans | B64G 1/641 | 244/173.1 |
| 2023/0192326 A1 * | 6/2023 | Marciniak | B64G 1/641 | 244/173.3 |

OTHER PUBLICATIONS

Saiki et al., Evaluation of the Separation Mechanism for a Small Carry-on Impactor aboard Hayabusa2. Trans JSASS Aerospace Tech Japan. 2020;18(1):9-15.

* cited by examiner

*Primary Examiner* — Assres H Woldemaryam
(74) *Attorney, Agent, or Firm* — McCarter & English, LLP; Dave S. Christensen

(57) ABSTRACT

A spin release mechanism and a method of launching objects from extraterrestrial sites is disclosed. The mechanism includes a first bracket and a second bracket spaced apart from the first bracket. A guide mechanism is provided operably coupled between the first bracket and second bracket and configured to axially restrain the second bracket. A release ring is provided rotationally coupled to the first bracket and operably coupled to the guide mechanism to selectively allow axial and rotational movement of the second bracket. A releasable lock mechanism is provided coupled to the first bracket and configured to selectively rotate the release ring.

20 Claims, 8 Drawing Sheets

SYSTEM AND METHOD OF EJECTING A PAYLOAD FROM AN EXTRATERRESTRIAL SURFACE

BACKGROUND

The subject matter disclosed herein relates to a system for ejecting a payload from an extraterrestrial vehicle that simultaneously translates and rotates the payload relative to the vehicle.

Marman clamps release rings are commonly used to deploy payloads from an extraterrestrial surface, such as on a spacecraft for example. A typical Marman clamp system is found in NASA's Marman Clamp System Design Guidelines, Guideline No. GD-ED-2214.

A Marman clamp is a band clamp that allows two cylindrical interfaces to be clamped together. The clamp includes a circular strap with an interior V-shaped groove. Tension is applied to the strap with a threaded bolt and nuts connecting to the ends of the strap. As the tension increases, the V-groove wedges over flanges on the circular parts to be assembled, providing the force that holds the ends of the two cylinders together.

To separate the payload, explosive threaded bolts are activated to release the ends of the straps. In some applications, a pyrotechnic pin puller is used in place of the explosive threaded bolts. Once the bolts or pin puller is activated, the straps are released and the payload is freed from the connection to the spacecraft.

BRIEF DESCRIPTION OF THE DISCLOSURE

According to one aspect of the disclosure, a spin release mechanism is provided. The mechanism includes a first bracket and a second bracket spaced apart from the first bracket. A guide mechanism is provided operably coupled between the first bracket and second bracket and configured to axially restrain the second bracket. A release ring is provided rotationally coupled to the first bracket and operably coupled to the guide mechanism to selectively allow axial and rotational movement of the second bracket. A releasable lock mechanism is provided coupled to the first bracket and configured to selectively rotate the release ring.

In addition to one or more of the features described herein, or as an alternative, further embodiments of the mechanism may include at least one guide roller and a helical guide rail operably coupled to the guide roller, wherein the guide mechanism is configured to release the helical guide rail upon rotation of the release ring.

In addition to one or more of the features described herein, or as an alternative, further embodiments of the mechanism may include at least one spring-loaded lock mechanism coupled to the first bracket and releasably coupled to the second bracket, the at least one spring-loaded lock mechanism configured to axially and rotationally move the release ring and the second bracket.

In addition to one or more of the features described herein, or as an alternative, further embodiments of the mechanism may include a releasable lock mechanism configured to move the second bracket upon rotation of the release ring by the at least one spring-loaded lock mechanism.

In addition to one or more of the features described herein, or as an alternative, further embodiments of the mechanism may include at least one spring-loaded lock mechanism arranged on an angle relative to a plane of the first bracket, the angle being greater than zero degrees and less than 90 degrees.

In addition to one or more of the features described herein, or as an alternative, further embodiments of the mechanism may include a spring assembly operably coupled between the first bracket and second bracket in a compressed position.

In addition to one or more of the features described herein, or as an alternative, further embodiments of the mechanism may include a spring assembly configured to move to an expanded position upon rotation of the release ring.

In addition to one or more of the features described herein, or as an alternative, further embodiments of the mechanism may include a spin release mechanism configured to launch an object situated on the second bracket.

In addition to one or more of the features described herein, or as an alternative, further embodiments of the mechanism may include a third bracket and a fourth bracket. Each of the second, third, and fourth brackets are operably connected to a respective spring-loaded lock mechanism.

In addition to one or more of the features described herein, or as an alternative, further embodiments of the mechanism may include spring-loaded lock mechanisms configured to activate in series.

In addition to one or more of the features described herein, or as an alternative, further embodiments of the mechanism may include a release ring including at least one guide roller.

According to another aspect of the disclosure a method of launching objects from extraterrestrial sites is provided. The method includes providing a spin release mechanism. An object is coupled to the second bracket. The releasable lock mechanism is released to selectively rotate the release ring and propel the object in a direction away from the first bracket.

In addition to one or more of the features described herein, or as an alternative, further embodiments of the method may include releasing a helical guide rail of the guide mechanism upon rotation of the release ring.

In addition to one or more of the features described herein, or as an alternative, further embodiments of the method may include a spin release mechanism including at least one spring-loaded lock mechanism coupled to the first bracket and releasably coupled to the second bracket, the at least one spring-loaded lock mechanism configured to axially and rotationally move the second bracket.

In addition to one or more of the features described herein, or as an alternative, further embodiments of the method may include a releasable lock mechanism configured to move the second bracket upon rotation of the release ring by the at least one spring-loaded lock mechanism.

In addition to one or more of the features described herein, or as an alternative, further embodiments of the method may include a spin release mechanism including a spring assembly operably coupled between the first bracket and second bracket in a compressed position.

In addition to one or more of the features described herein, or as an alternative, further embodiments of the method may include moving the spring assembly to an expanded position upon rotation of the release ring.

In addition to one or more of the features described herein, or as an alternative, further embodiments of the method may include a spin release mechanism configured to rotate the object situated on the second bracket about an axis extending through a center of the spin release mechanism upon rotation of the release ring.

In addition to one or more of the features described herein, or as an alternative, further embodiments of the method may include a spin release mechanism including a third bracket and a fourth bracket. Each of the second, third, and fourth brackets are operably connected to a respective spring-loaded lock mechanism, respectively.

In addition to one or more of the features described herein, or as an alternative, further embodiments of the method may include activating the spring-loaded lock mechanisms in series prior to rotation of the release ring.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Traditionally, Marman clamps were used to separate a component from a vehicle, such as a satellite from a launch vehicle for example. A disadvantage of the Marman clamp is the mass and volume of the clamp required to deploy a payload. As the desire for larger and correspondingly heavier payloads increases, logistical issues are created in deploying the payloads from an extraterrestrial surface. Further, Marman clamps were intended to be used with cylindrical housings, which further limited its usefulness when other shapes were desired.

Other commonly used devices require precisely-timed simultaneous firing of release mechanisms to achieve a desired velocity and spin rate. Such devices may be prone to failure due to misfire or mistiming in one or more of the release mechanisms that causes an undesired force or torque loading on the payload.

Embodiments of the present disclosure provide for precise deployment of a payload without requiring simultaneous release of multiple Hold Down Release Mechanisms (HDRMs). Further embodiments of the present disclosure provide for reduced or minimal tip-off and lateral velocity imparted on the payload. Further embodiments of the present disclosure impart low-uncertainty axial velocity and spin rate on the payload without initiating the simultaneous release of multiple Hold Down Release Mechanisms (HDRMs). The device does not use precise timing and "simultaneous" release of multiple release devices in order to provide predictable, reliable performance. Rather the device is configured to release a releasable lock mechanism after release of one or more spring-loaded lock mechanisms.

Figure 1:
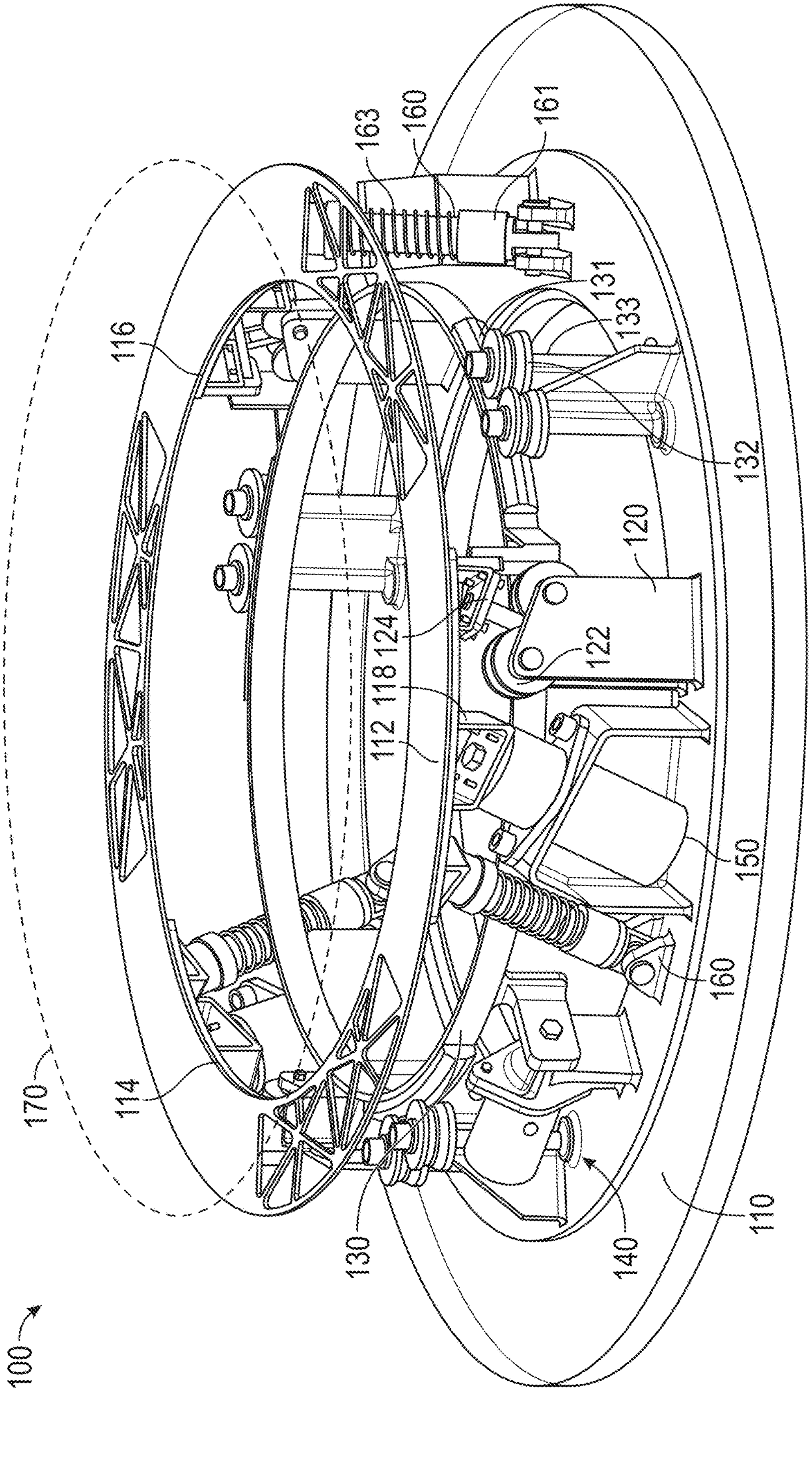
FIG. 1 is a perspective view of a spin release mechanism supporting a payload in accordance with an embodiment.
Figure 2:
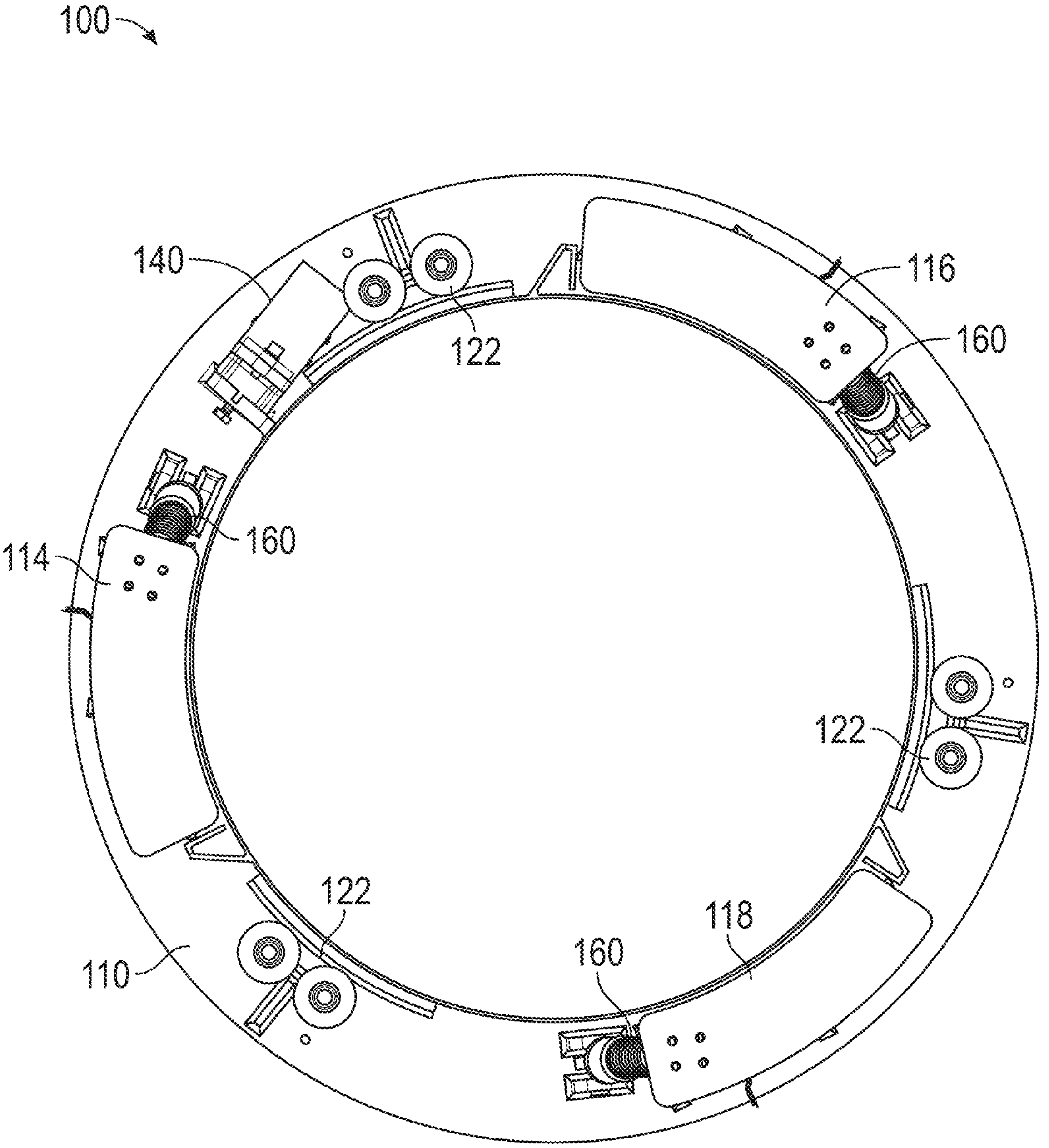
FIG. 2 is a top view of the spin release mechanism of FIG. 1 without a payload.
Figure 3:
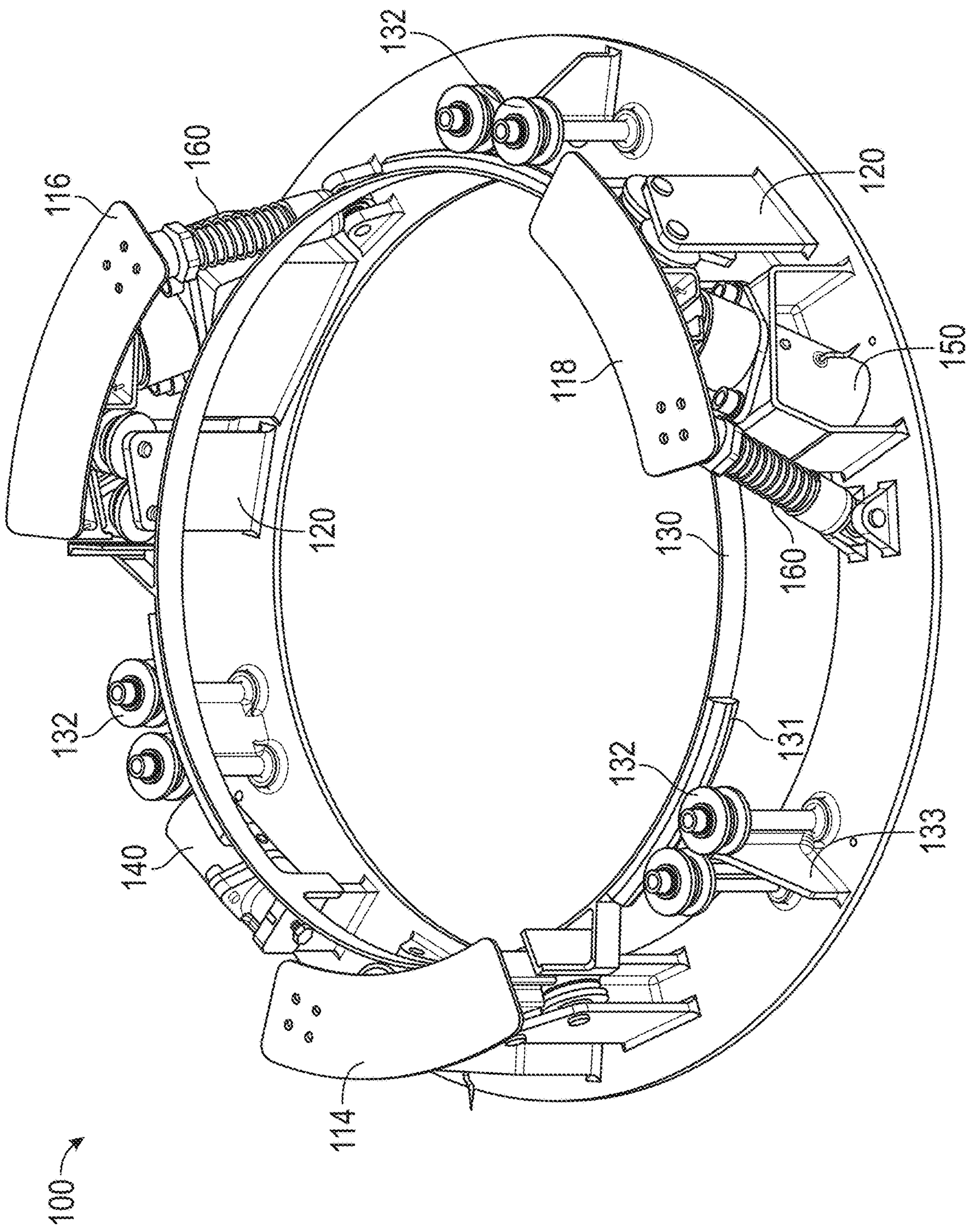
FIG. 3 is a perspective view of the spin release mechanism of FIG. 1 without a payload.

Referring now to FIGS. 1 to 3, an embodiment is shown of a spin release mechanism 100. In an embodiment, the spin release mechanism 100 includes a first bracket 110 and a second bracket 112 spaced apart from the first bracket 110. The second bracket 112 may be separated from the first bracket 110 by a distance ranging from 180 mm to 220 mm. The distance between brackets 110 and 112 may be increased or decreased to accommodate payloads of varying mass. In some embodiments, the spin release mechanism 100 further includes a third bracket 114, a fourth bracket 116, and/or a fifth bracket 118 situated under the second bracket 112 and spaced apart from the first bracket 110 at the same distance as one another.

The spin release mechanism 100 may be configured to launch an payload 170 (i.e., an object, capsule, or sample) situated on the second bracket 112. In an embodiment, the payload 170 may not be secured to the second bracket 112 but rather is held in place by gravity. In other embodiments, the payload 170 may be directly coupled to the third, fourth, and/or fifth brackets 114, 116, 118 by fasteners, magnets, or other securing means.

The spin release mechanism 100 may further include a guide mechanism 120 operably coupled between the first bracket 110 and second bracket 112. In some embodiments, the guide mechanism 120 is configured to directly axially restrain the second bracket 112. In some embodiments, the spin release mechanism 100 includes a plurality of guide mechanisms 120 that are configured to selectively and axially restrain the third bracket 114, the fourth bracket 116 and the fifth bracket 118. It should be appreciated that while the illustrated embodiments describe three guide mechanisms 120, this is for example purposes and the claims should not be so limited. In other embodiments, the spin release mechanism 100 may have more or fewer guide mechanisms 120.

The guide mechanism 120 may include at least one guide roller 122 and a helical guide rail 124 operably coupled to the guide roller 122. In the illustrated embodiment, the guide mechanism 120 include a pair of guide rollers 122 that are spaced apart to allow the helical guide rail 124 to be disposed therebetween. The guide mechanism 120 may be configured to release the helical guide rail 124 upon rotation of a release ring 130. In some embodiments, a patterned series of helical guide rails 124 and guide rollers 122 is provided and configured to constrain the motion of ejection of the payload 170 to a desired helix path (i.e., a combination of spin and axial velocity). The combination of helical guide rails 124 and guide rollers 122 may impart a reduced or minimal amount of tip-off and lateral velocity on the payload 170 while providing high precision for imparted axial velocity and spin rate.

The spin release mechanism 100 may further include the release ring 130, which is rotationally coupled to the first bracket 110. The release ring 130 may be operably coupled to the guide mechanism 120 to selectively allow axial and rotational movement of the second bracket 112. In some embodiments, the release ring 130 is also configured to selectively allow axial and rotational movement of the third bracket 114, the fourth bracket 116, and/or the fifth bracket 118.

The release ring 130 may be movably coupled to at least one release roller 132. In an embodiment, the release ring 130 includes carriage member 131 disposed on an outer diameter of the release ring 130. The carriage member 131 is shaped to engage a slot on the release rollers 132. It should be appreciated that the carriage member 131 and the slot cooperate to restrain the release ring 130 axially and maintain rotational movement in a plane. In some embodiments, the release ring 130 is movably coupled to pairs of release rollers 132. For example, in the illustrated embodiment the release ring 130 is movably coupled to three pairs of release rollers 132. The release rollers 132 may be configured to guide rotation of the release ring 130 after release of a releasable lock mechanism 140. In the illustrated embodiment, the release rollers 132 are coupled to the first bracket 110 by standoff members 133.

At least one releasable lock mechanism 140 may be coupled to the first bracket 110 and configured to selectively rotate the release ring 130. In some embodiments, the at least one releasable lock mechanism 140 may be arranged substantially parallel to a plane of the first bracket 110. In some embodiments, the force applied to the release ring 130 by the releasable lock mechanism 140 is tangential to the diameter of the release ring 130. Such a force causes rotation of the release ring 130, for example in a counterclockwise direction. In an embodiment, the releasable lock mechanism 140 is a Model ERM2000 launch lock device manufactured by Ensign-Bickford Aerospace & Defense of Simsbury, Connecticut. The releasable lock mechanism 140 includes a biasing member (not shown), such as a spring for example, that is selectively released to rotate the release ring 130.

The spin release mechanism 100 may further include at least one spring-loaded lock mechanism 150 coupled to the first bracket 110 and releasably coupled to the second bracket 112. The at least one spring-loaded lock mechanism 150 may be arranged on an angle relative to a plane of the first bracket 110, the angle being greater than zero degrees and less than 90 degrees. In further embodiments, the angle is greater than 20 degrees and less than 50 degrees. In further embodiments, the angle is 21, 22, 23, 24, 25, 26, 27, 28, 29, 30, or any degree therebetween. In some embodiments, the at least one spring-loaded lock mechanism 150 is angled in a direction with a desired ejection helix of the payload 170. In an embodiment, the spring-loaded lock mechanism 150 is a model ERM4000 launch lock device manufactured by Ensign-Bickford Aerospace & Defense of Simsbury, Connecticut.

The at least one spring-loaded lock mechanism 150 may be configured to axially and rotationally move the second bracket 112 to initiate rotation of the release ring 130. In some embodiments, a spring-loaded lock mechanism 150 may be configured to axially and rotationally move one or more of the third bracket 114, the fourth bracket 116, or the fifth bracket 118. The at least one spring-loaded lock mechanism 150 may be configured to move the second, third, and/or fourth brackets 112, 114, 116 to initiate rotation of the release ring 130.

Figure 7:
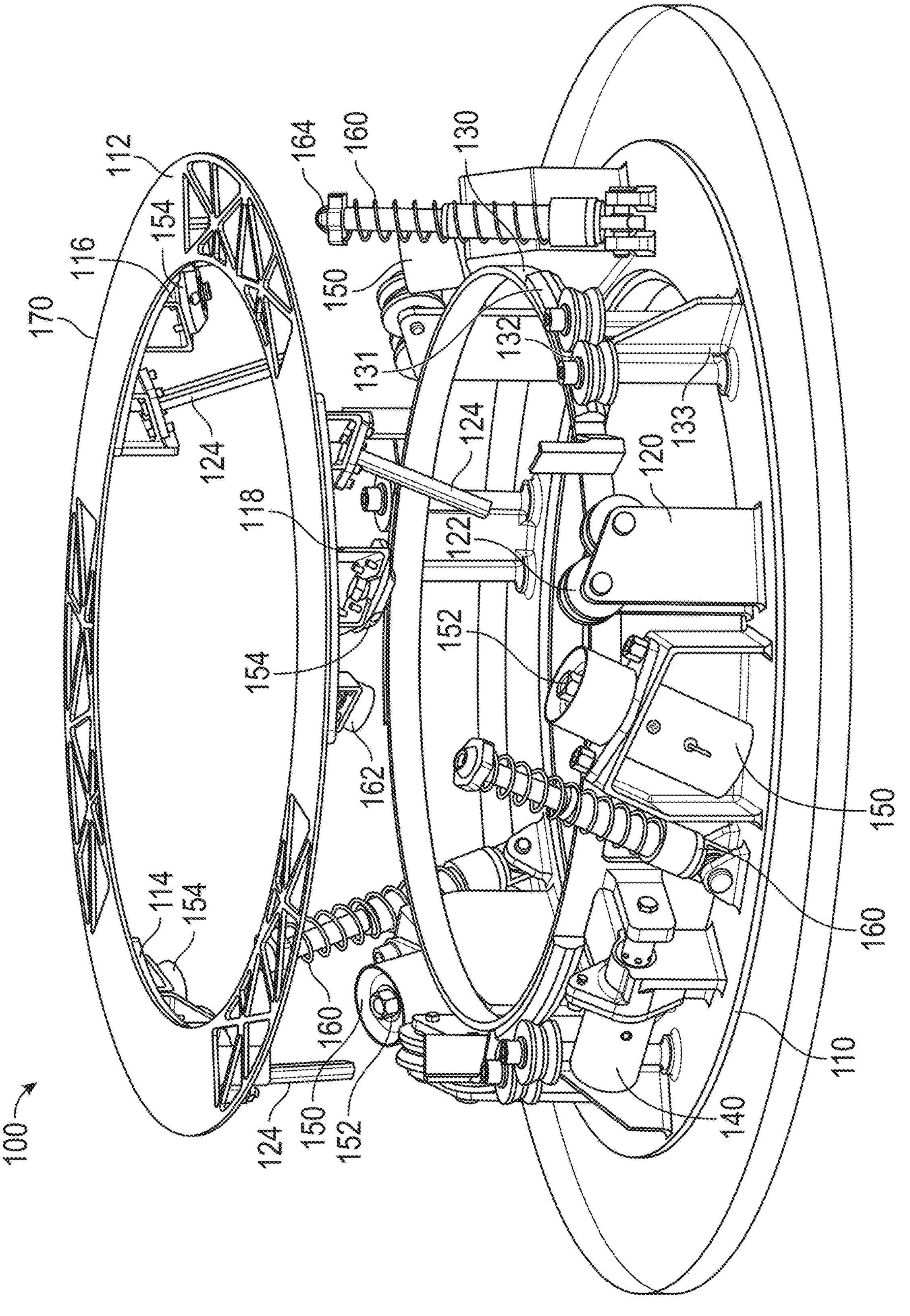
FIG. 7 is a perspective view of the spin release mechanism of FIG. 1 after release of the payload in accordance with an embodiment.

In some embodiments, an end of each spring-loaded lock mechanism 150 may include a cup structure 152 as depicted in FIG. 7. In further embodiments, the cup structure 152 is situated at the end of the spring-loaded lock mechanism 150 contacting the third bracket 114, the fourth bracket 116, or the fifth bracket 118. Each third, fourth, and/or fifth bracket 114, 116, 118 may include a corresponding cone structure 154 configured to releasably attach to a cup structure 152.

In further embodiments, the spring-loaded lock mechanisms 150 are configured to activate in series. In such embodiments, the order of activation of the spring-loaded lock mechanisms 150 does not affect ejection of the payload 170. No motion between the releasable lock mechanism 140 and payload 170 is expected while activation of the spring-loaded lock mechanisms 150 occurs. The two steps of releasing the spring-loaded lock mechanisms 150 before the releasable lock mechanism 140 allows the payload 170 to be released without precise/simultaneous activation timing of the spring-loaded lock mechanisms 150.

The components of the spin release mechanism 100 may be composed of materials suitable for use in space or on extraterrestrial sites. For example, the lock mechanisms 140 and 150, cup structure 152, cone structure 154, guide roller 122, release roller 132, and/or guide rails 124 may be composed of aluminum or stainless steel.

The spin release mechanism 100 may further include at least one spring assembly 160 operably coupled between the first bracket 110 and the second bracket 112 when in a compressed position. Compression of spring assembly 160 is discussed in further detail below with regards to FIG. 4. In some embodiments, the spring assembly 160 is operable coupled between the third bracket 114, the fourth bracket 116, and/or the fifth bracket 118 when in a compressed position. The spring assembly 160 may be arranged on an angle relative to a plane of the first bracket 110, the angle being greater than zero degrees and less than 90 degrees. In some embodiments, each spring assembly 160 is oriented at the same angle as an associated spring-loaded lock mechanism 150. In an embodiment, the spring assembly 160 is arranged on an angle of 23 degrees relative to an axis extending perpendicular to the first bracket 110.

Figure 8:
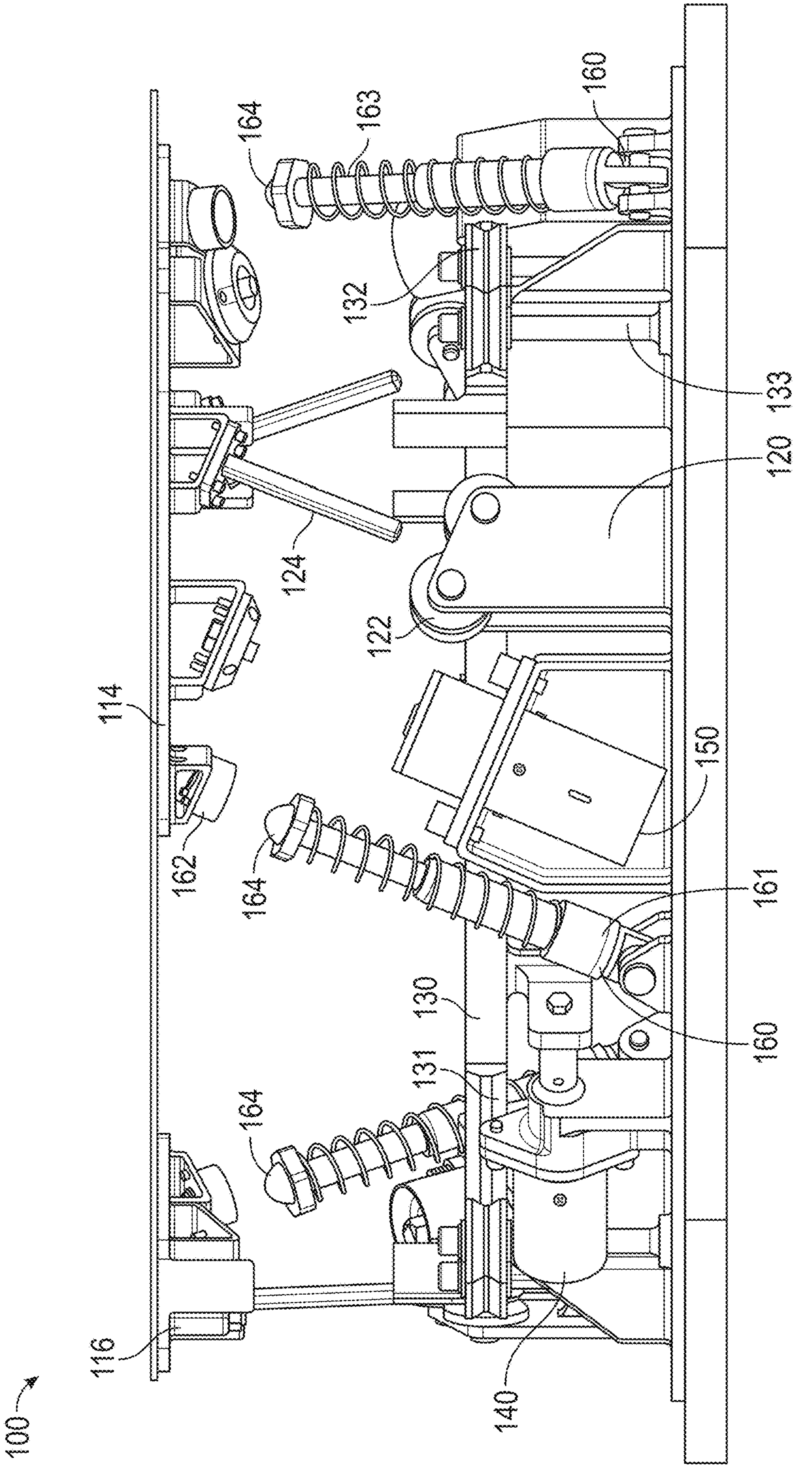
FIG. 8 is a side view of the spin release mechanism of FIG. 1 after release of the payload in accordance with an embodiment.

Each spring assembly 160 may include a body 161 having an end pivotally coupled to the first bracket 110. Referring now to FIGS. 7 and 8, in some embodiments, each spring assembly 160 is connected to the third bracket 114, the fourth bracket 116, and/or the fifth bracket 118 by an open ball and socket interface 165 on an end opposing the end pivotably coupled to the first bracket 110. For example, the spring assembly 160 may include a ball joint 164 situated on an end releasably coupled to the socket 162 of the third bracket 114, the fourth bracket 116, or the fifth bracket 118. In some embodiments, disposed about the body 161 is a biasing member, such as compression spring 163, that applies a force on the socket 162.

Figure 4:
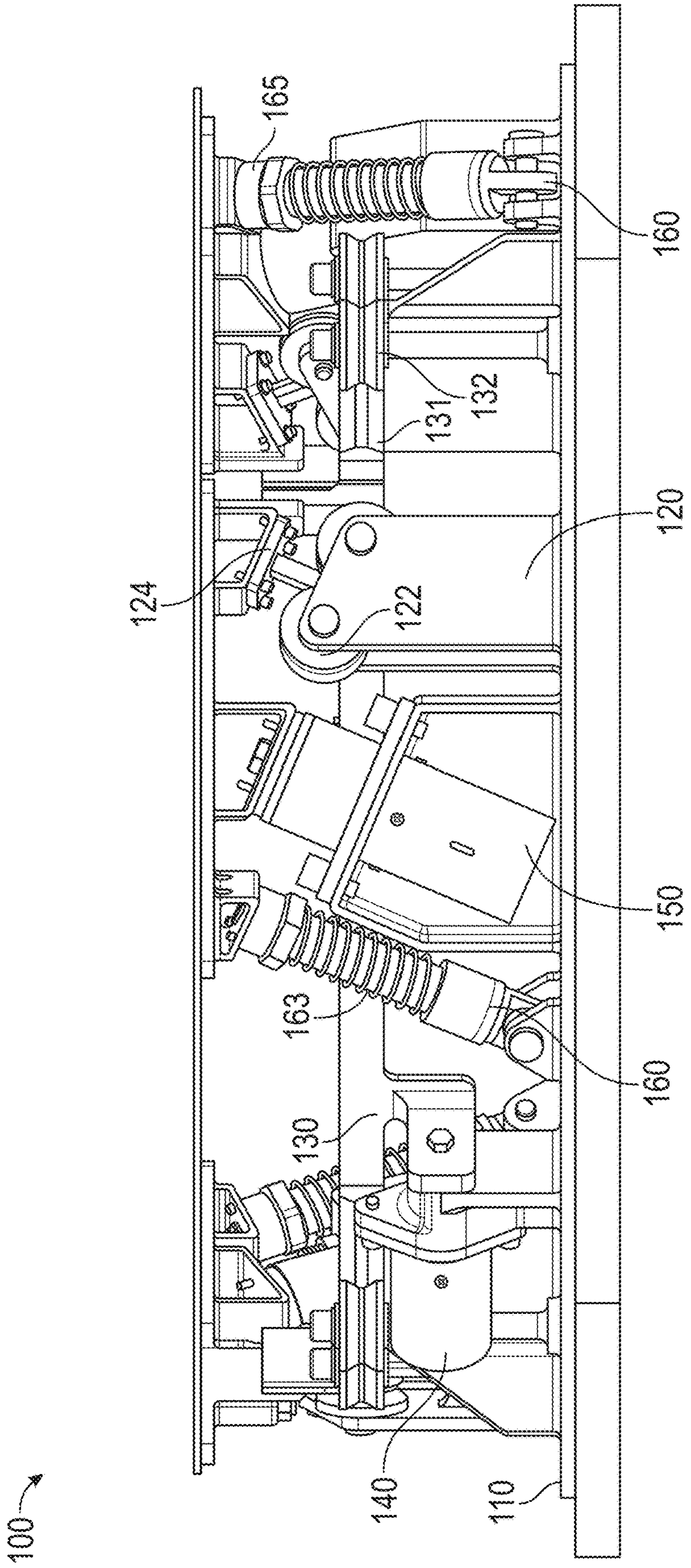
FIG. 4 is a side view of the spin release mechanism of FIG. 1 in a compressed state in accordance with an embodiment.

Referring now to FIG. 4, an embodiment is shown of the spin release mechanism 100 in a compressed state. The spring assembly 160 may be configured to move from the compressed state to an expanded position upon rotation of the release ring 130. In some embodiments, the spring assembly 160 measures from 50 to 80 mm in length in a compressed state. In further embodiments, the spring assembly 160 measures from 60 to 70 mm in length in a compressed state.

Figure 5:
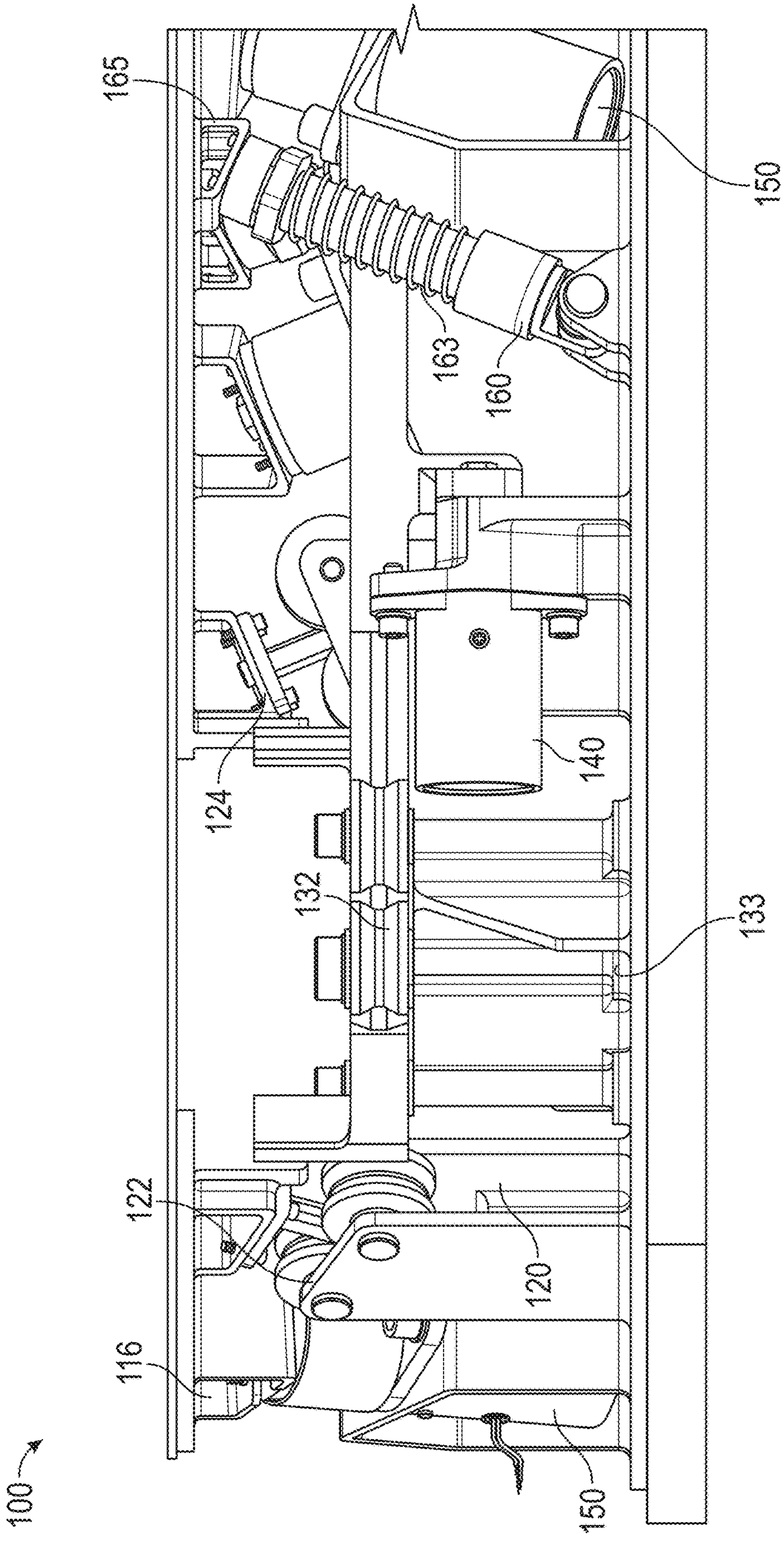
FIG. 5 is a side view of the spin release mechanism of FIG. 1 upon release of a lock mechanism in accordance with an embodiment.

Referring now to FIG. 5, an embodiment is shown of the spin release mechanism 100 upon release of the releasable lock mechanism 140. At time of release, a force from the releasable lock mechanism 140 causes the release ring 130 to rotate counterclockwise, freeing the third bracket 114, the fourth bracket 116, and/or the fifth bracket 118 to both rotate counterclockwise and move axially in a direction defined by the guide rails 124 and rollers 122.

Figure 6:
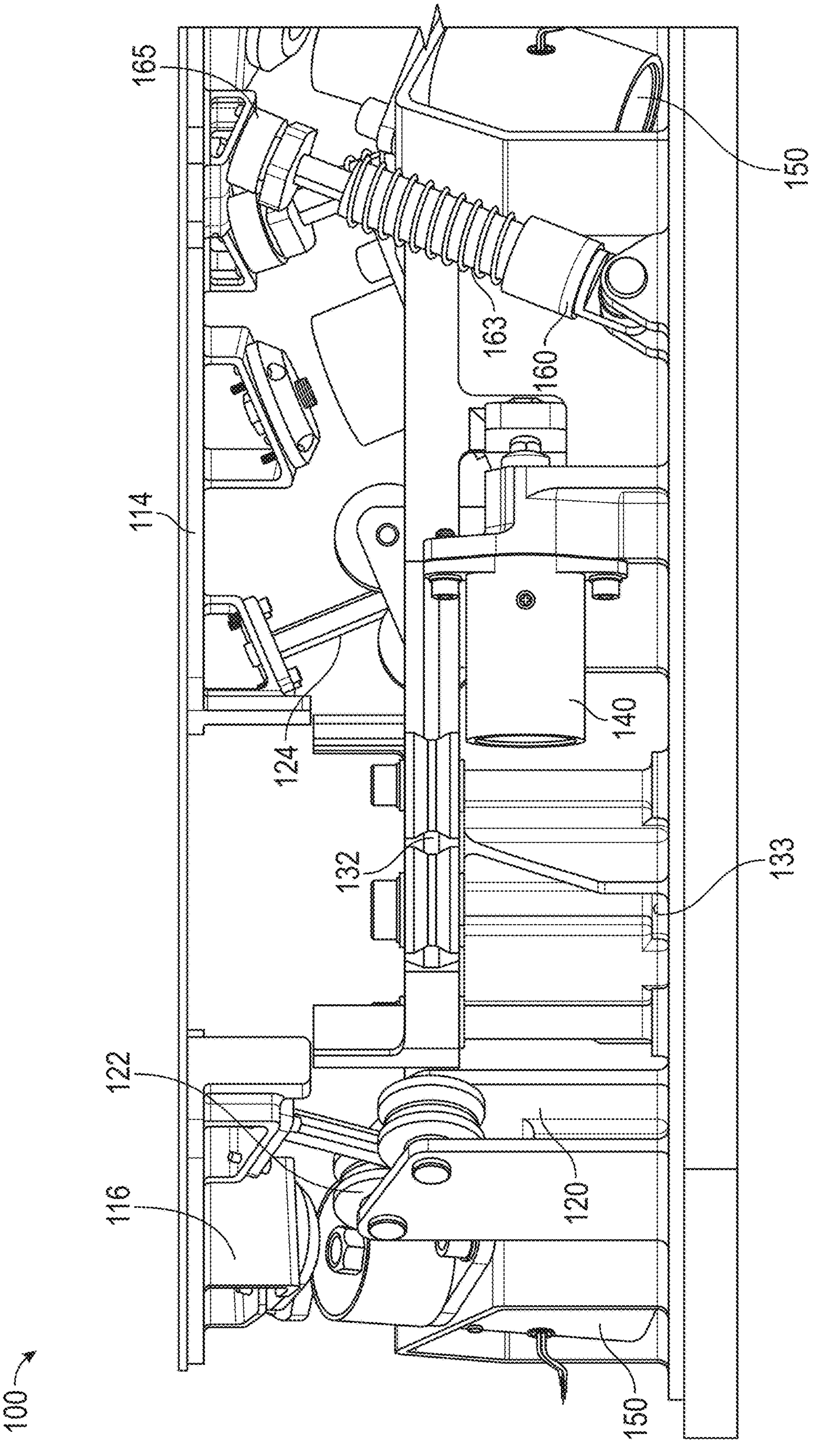
FIG. 6 is a side view of the spin release mechanism of FIG. 1 in an extended state in accordance with an embodiment.

Referring now to FIG. 6, an embodiment is shown of the spin release mechanism 100 in an extended state. In the extended state, the spring assembly 160 extends away from the first bracket 110, pushing the third bracket 114, the fourth bracket 116, and/or the fifth bracket 118, guided by the guide rails 124 and guide rollers 122, along its ejection helix.

Referring now to FIGS. 7 and 8, the spring assembly 160 reaches its maximum extension prior to the guide rails 124 disengaging the guide rollers 122. The third bracket 114, the fourth bracket 116, and/or the fifth bracket 118 continue their helical trajectory after the guide rails 124 clear the guide rollers 122. In some embodiments, the spring assembly 160 measures from 100 to 150 mm in length at maximum extension. In further embodiments, the spring assembly 160 measures from 125 to 140 mm in length at maximum extension.

It should be appreciated that while embodiments herein may refer to the use of the spin release mechanism with respect to a particular application, such as a spacecraft that is returning sample materials from an extraterrestrial location, such as the moon or lunar surface, this is for example purposes and the claims should not be so limited. In other embodiments, the spin release mechanism described herein may be used in connection with spacecraft originating from other terrestrial or extraterrestrial bodies, such as but not limited to Mars, asteroids, Kupier Belt objects, and Trans-Neptunian objects for example. In still further embodiments, the spin release mechanism may be used on moons/satellite objects of other solar system planets, such as Titan or Europa for example.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It should also be noted that the terms “first”, “second”, “third”, “upper”, “lower”, and the like may be used herein to modify various elements. These modifiers do not imply a spatial, sequential, or hierarchical order to the modified elements unless specifically stated.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “exemplary” is used herein to mean “serving as an example, instance or illustration.” Any embodiment or design described herein as “exemplary” is not necessarily to be construed as preferred or advantageous over other embodiments or designs. The terms “at least one” and “one or more” may be understood to include any integer number greater than or equal to one, i.e. one, two, three, four, etc. The terms “a plurality” may be understood to include any integer number greater than or equal to two, i.e. two, three, four, five, etc. The term “connection” may include both an indirect “connection” and a direct “connection.”

The terms “about,” “substantially,” “approximately,” and variations thereof, are intended to include the degree of error associated with measurement of the particular quantity based upon the equipment available at the time of filing the application. For example, “about” can include a range of +8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A spin release mechanism comprising:

a first bracket;

a second bracket spaced apart from the first bracket;

a guide mechanism operably coupled between the first bracket and second bracket and configured to axially restrain the second bracket;

a release ring rotationally coupled to the first bracket and operably coupled to the guide mechanism to selectively allow axial and rotational movement of the second bracket; and a releasable lock mechanism coupled to the first bracket and configured to selectively rotate the release ring.

2. The mechanism of claim 1, wherein the guide mechanism includes at least one guide roller; and a helical guide rail operably coupled to the guide roller, wherein the guide mechanism is configured to release the helical guide rail upon rotation of the release ring.

3. The mechanism of claim 1, further comprising at least one spring-loaded lock mechanism coupled to the first bracket and releasably coupled to the second bracket, the at least one spring-loaded lock mechanism configured to axially and rotationally move the release ring and the second bracket.

4. The mechanism of claim 3, wherein the releasable lock mechanism is configured to move the second bracket upon rotation of the release ring by the at least one spring-loaded lock mechanism.

5. The mechanism of claim 4, wherein the at least one spring-loaded lock mechanism is arranged on an angle relative to a plane of the first bracket, the angle being greater than zero degrees and less than 90 degrees.

6. The mechanism of claim 1, further comprising a spring assembly operably coupled between the first bracket and second bracket in a compressed position.

7. The mechanism of claim 6, wherein the spring assembly is configured to move to an expanded position upon rotation of the release ring.

8. The mechanism of claim 1, wherein the spin release mechanism is configured to launch an object situated on the second bracket.

9. The mechanism of claim 1, further comprising:

a third bracket; and a fourth bracket, each of the second, third, and fourth brackets operably connected to a respective spring-loaded lock mechanism.

10. The mechanism of claim 9, wherein the spring-loaded lock mechanisms are configured to activate in series.

11. The mechanism of claim 1, wherein the release ring comprises at least one guide roller.

12. A method of launching objects from extraterrestrial sites, comprising:

providing the spin release mechanism of claim 1;

coupling an object to the second bracket; and releasing the releasable lock mechanism to selectively rotate the release ring and propel the object in a direction away from the first bracket.

13. The method of claim 12, further comprising releasing a helical guide rail of the guide mechanism upon rotation of the release ring.

14. The method of claim 12, wherein the spin release mechanism further comprises at least one spring-loaded lock mechanism coupled to the first bracket and releasably coupled to the second bracket, the at least one spring-loaded lock mechanism configured to axially and rotationally move the second bracket.

15. The method of claim 14, wherein the releasable lock mechanism is configured to move the second bracket upon rotation of the release ring by the at least one spring-loaded lock mechanism.

16. The method of claim 12, wherein the spin release mechanism further comprises a spring assembly operably coupled between the first bracket and second bracket in a compressed position.

17. The method of claim 16, further comprising moving the spring assembly to an expanded position upon rotation of the release ring.

18. The method of claim 12, wherein the spin release mechanism is configured to rotate the object situated on the second bracket about an axis extending through a center of the spin release mechanism upon rotation of the release ring.

19. The method of claim 12, wherein the spin release mechanism further comprises:

a third bracket; and a fourth bracket, each of the second, third, and fourth brackets operably connected to a respective spring-loaded lock mechanism, respectively.

20. The method of claim 18, further comprising activating the spring-loaded lock mechanisms in series prior to rotation of the release ring.

* * * * *